(12) United States Patent
Mejuhas et al.

(10) Patent No.: US 7,857,561 B2
(45) Date of Patent: Dec. 28, 2010

(54) SEAT FIXING DEVICE

(75) Inventors: Marsel Mejuhas, München (DE); Jürgen Doll, Kressbronn (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 966 days.

(21) Appl. No.: 11/589,944

(22) Filed: Oct. 31, 2006

(65) Prior Publication Data

US 2007/0138821 A1 Jun. 21, 2007

(30) Foreign Application Priority Data

Dec. 1, 2005 (DE) .................. 10 2005 057 208

(51) Int. Cl.
*B60P 7/08* (2006.01)
(52) U.S. Cl. .................................................. 410/105
(58) Field of Classification Search .............. 410/104, 410/105, 80; 244/118.1, 118.6, 122 R; 248/503.1
See application file for complete search history.

(56) References Cited

U.S. PATENT DOCUMENTS

| | | | |
|---|---|---|---|
| 3,344,749 A | 10/1967 | Bass et al. | |
| 3,523,669 A | 8/1970 | Avallone | |
| 3,605,637 A | 9/1971 | Prete, Jr. | |
| 4,708,549 A * | 11/1987 | Jensen | 410/105 |
| 4,771,969 A | 9/1988 | Dowd | |

FOREIGN PATENT DOCUMENTS

| DE | 32 32 234 A1 | 5/1984 |
|---|---|---|
| DE | 34 47 178 A1 | 7/1986 |
| DE | 195 20 959 A1 | 12/1996 |
| DE | 198 12 490 A1 | 9/1999 |
| DE | 20 2004 015 211 U1 | 12/2004 |
| DE | 103 41 624 A1 | 4/2005 |

OTHER PUBLICATIONS

Search report from the German Patent Office dated May 20, 2008 for a corresponding German Patent Application 06017258.2-2422.

* cited by examiner

*Primary Examiner*—Stephen Gordon
(74) *Attorney, Agent, or Firm*—Posz Law Group, PLC

(57) ABSTRACT

A seat fixing device for fixing a seat to a floor includes a device body. At least one vertical fixing member extends from the device body, and at least one horizontal fixing member is slidable along the device body and includes at least one actuating unit. The actuating unit includes a lock having a locking function that is dependent upon an operating parameter of the horizontal fixing member.

16 Claims, 7 Drawing Sheets

SEAT FIXING DEVICE

CROSS REFERENCE TO RELATED APPLICATION

This application is related to, claims priority from, and incorporates by reference German Patent Application No. DE 10 2005 057 208.1, filed on Dec. 1, 2005.

FIELD OF THE INVENTION

The invention is related generally to seat fixing devices, and in particular to a seat fixing device that is simple to install and remove and that includes installation and removal safety features.

BACKGROUND OF THE INVENTION

A seat fixing device for fixing a seat to a floor of an airplane is already known, the seat fixing device having horizontal fixing means and vertical fixing means. During installation, first of all the vertical fixing means are introduced into recesses of a fixing rail. Subsequently, the seat fixing device is displaced in the longitudinal direction of the fixing rail, so that the vertical fixing means come to lie under side flanks of the fixing rail and the horizontal fixing means can be introduced positively into the recesses of the fixing rail in the longitudinal direction of the fixing rail. Subsequently, by means of an actuating unit of the seat fixing device, which actuating unit is designed as a locking unit, the horizontal fixing means are positively locked in their vertical direction and the vertical fixing means are non-positively clamped under the side flanks of the fixing rail.

SUMMARY OF THE INVENTION

The invention provides a seat fixing device with increased safety with regard to removal and/or in particular with increased safety with regard to installation and/or with increased ease of removal and/or ease of installation. In particular for fixing an airplane seat to a floor of an airplane, with at least one horizontal fixing means and at least one vertical fixing means and with at least one actuating unit.

Preferably, at least one function of the actuating unit is coupled to at least one operating parameter.

As discussed herein, the term "horizontal fixing means" is to be understood in particular as meaning a fixing device which is used for fixing in at least one direction aligned at least essentially parallel to a defined floor-supporting plane of the seat fixing device or—as viewed in a fitted position—to a main floor plane of the floor on which a seat is to be stood, while the term "vertical fixing means" is to be understood in particular as meaning a fixing means which is used for fixing in at least one direction aligned at least essentially perpendicularly to the floor-supporting plane of the seat fixing device.

The term "actuating unit" is to be understood in particular as meaning a unit which can be actuated by an operator during the installation, removal, maintenance and/or adjustment of the seat fixing device.

An appropriate configuration makes it possible for operating conditions which are present to be taken into account, and increased safety with regard to removal and in particular installation and/or increased ease of removal and/or installation can be achieved.

In this case, the operating parameter can be formed by various variables appearing expedient to a person skilled in the art, such as service lives, as a result of which, for example, after a certain service life an actuation could be prevented for safety reasons, or a spring force, as a result of which, for example, if a required tension force is missing, an actuation could be prevented for safety reasons.

The operating parameter, however, is particularly advantageously at least dependent on a position variable of a means. In this case, a "position variable" is to be understood in particular as meaning a variable of the distance of a seat fixing means from a further seat fixing means and/or from an external reference point, such as, for example, from a further seat fixing device and/or a reference point in an airplane, and/or a relative position of a seat fixing means from a further reference means.

Appropriate configuration makes it possible in particular to ensure correct positioning in a simple manner. Furthermore, a conclusion can advantageously be drawn, in particular by means of distance variables, as to the boundary conditions which are present, such as, in particular, as to the configuration of a fixing rail, etc. If, for example, certain distance variables are not present, it can be concluded that an incorrect fixing rail is present, and the function of the actuating unit, in particular a locking function, can be suppressed.

If the function of the actuating unit is coupled to a position of at least one fixing means, it can be ensured in a simple manner that the fixing means is positioned correctly before a function, in particular a locking function, of the actuating unit can be carried out.

The operating parameter can be detected by various units appearing expedient to a person skilled in the art, such as, for example, via a unit for electric, electromagnetic, optical and/or mechanical detection, such as, for example, via a laser distance sensor unit, a force sensor unit. However, a mechanical detection unit makes it advantageously possible to avoid an external power source, and a particularly structurally simple and cost-effective detection can be achieved.

In a further refinement of the invention, the actuating unit may serve as a locking unit, as a result of which, in particular, a particularly secure locking or fixing can be obtained, to be precise in particular if the actuating unit is provided for the purpose of only permitting locking if at least one specific operating parameter is present, preferably if at least one fixing means has at least one predefined position. In this case, the term "provided" is to be understood in particular as meaning specially equipped, designed and/or, if appropriate, programmed.

In this case, the actuating unit can be provided for non-positive and/or positive locking. With a positive lock, high forces can advantageously be reliably absorbed, and with a non-positive lock, an advantageous freedom from play can be obtained. If the actuating unit serves both to produce a non-positive lock and to produce a positive lock, additional components, construction space and weight can be saved.

If the seat fixing device comprises at least one latching mechanism which is provided for the positioning of at least one fixing means, in particular at least individual sequences can be at least partially automated, or an advantageous, automatic movement of a fixing means into a predefined position can be achieved, and the ease of installation can be increased.

Furthermore, it is proposed that the seat fixing device has at least one positioning-assisting unit with an output unit. In this case, "output unit" is to be understood in particular as meaning a unit for outputting an optical, tactile and/or acoustic signal, using which an operator can draw a conclusion about the positioning present, in particular about whether the positioning present is correct. An appropriate configuration can in turn in particular increase the safety with regard to installation and the ease of installation.

If the actuating unit at least partially forms a securing unit for securing another actuating unit, an undesired displacement of the actuating unit to be secured can be advantageously avoided and the safety with regard to removal and in particular installation can be further increased.

Furthermore, it is proposed that the actuating unit is at least partially realized integrally with a signal output unit, as a result of which additional components, weight, construction space and outlay on installation can be saved and, nevertheless, corresponding signals, such as acoustic, tactile and/or in particular optical signals can advantageously be output to an operator.

If the actuating unit which at least partially forms a securing unit comprises at least one pivotably mounted clamp, the latter can be realized in a particularly simple manner structurally, in particular the latter can be advantageously realized in a simple manner integrally with a signal output unit, preferably with an optical signal output unit.

A seat fixing device according to the invention is particularly advantageously suitable for fixing an airplane seat in an airplane, but it can also be used in other spheres appearing expedient to a person skilled in the art, such as, for example, in the sphere of vehicles, such as relatively large passenger cars, tour coaches or ferries, or within the context of chairs for halls, such as, for example, a congress hall, a theater hall or a cinema hall. Furthermore, the seat fixing device can also be used for securing loads, luggage or other goods being transported by any type of airplane and vehicle.

BRIEF DESCRIPTION OF THE DRAWINGS

Further advantages emerge from the following drawings, which illustrate exemplary embodiments of the invention. The drawings, the description and the claims contain numerous features in combination.

DETAILED DESCRIPTION OF THE EXEMPLARY EMBODIMENTS

Figure 1:
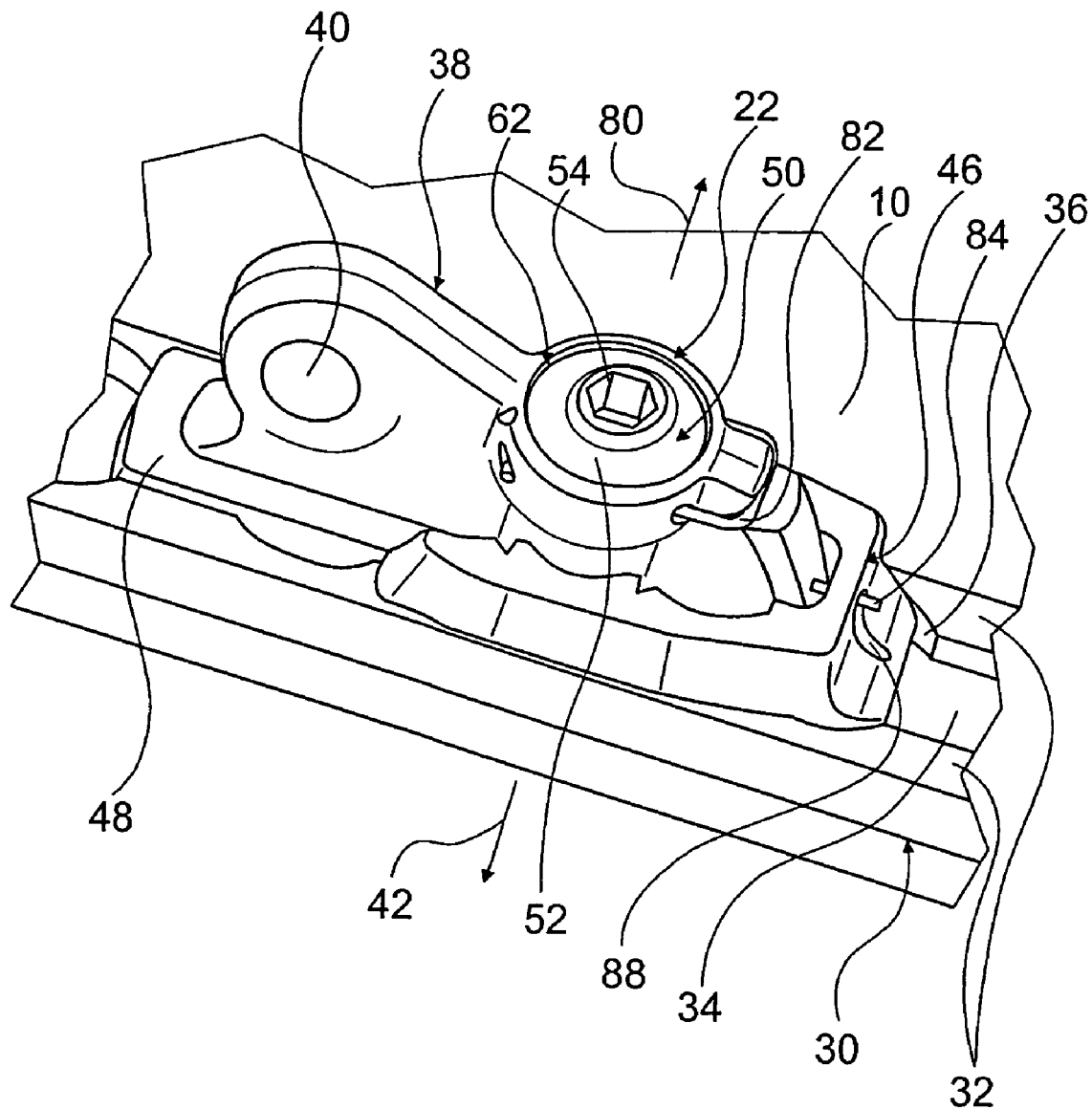
FIG. 1 shows a seat fixing device obliquely from above in the fitted state on a fixing rail.
Figure 2:
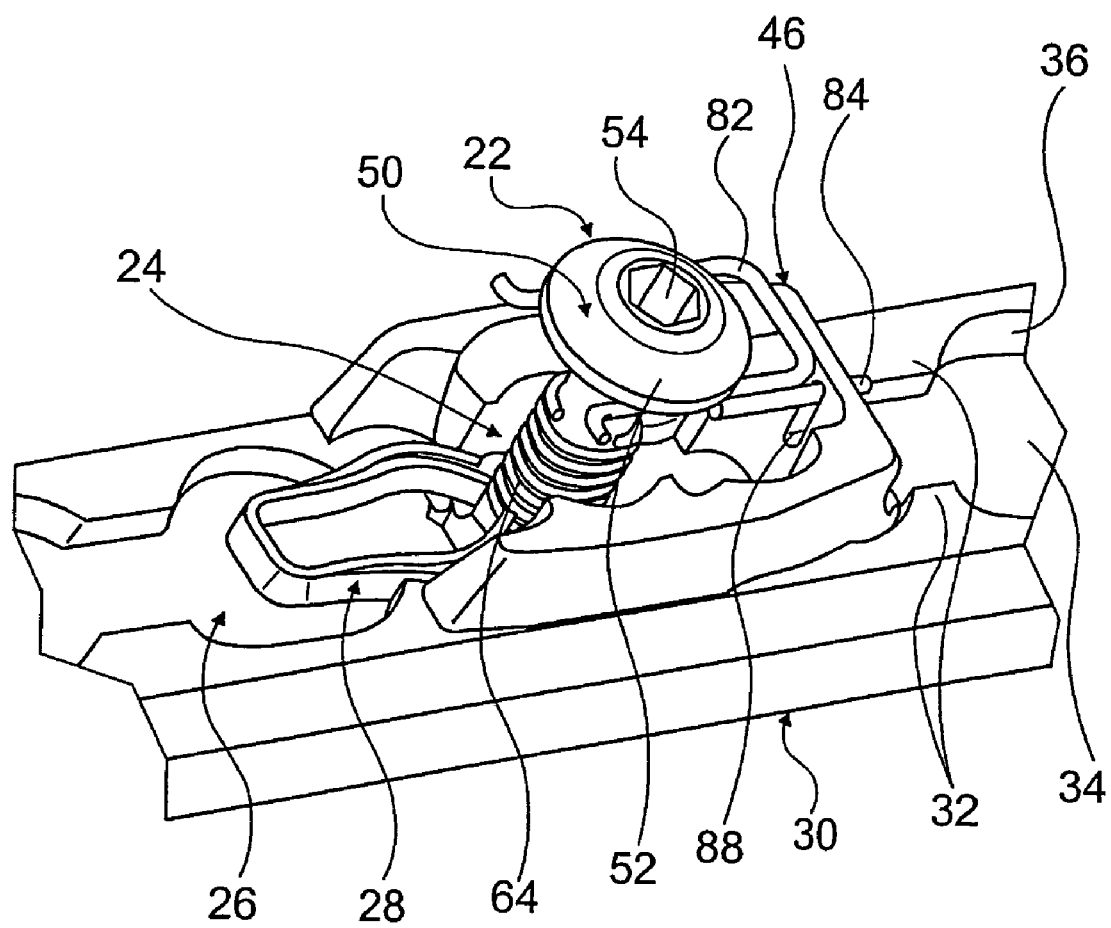
FIG. 2 shows individual parts of the seat fixing device from FIG. 1.

FIG. 1 shows a seat fixing device for fixing an airplane seat to a floor 10 or to a cabin floor of an airplane, to be precise to fixing rails 30 which run in the longitudinal direction of the airplane, are fastened to the cabin floor and are aligned parallel to the same. The fixing rails 30 end with their upper side flush with the floor 10 or the cabin floor of the airplane. The fixing rail 30 is formed by a hollow profile which, by means of mutually facing profile flanks 32 on its upper side, bounds a longitudinal channel 34. The longitudinal channel 34 has passage openings 36 which widen its free entry cross section to a predetermined size and are at a uniform distance from one another and are realized in the manner of drilled holes (FIGS. 1 to 4).

Figure 3:
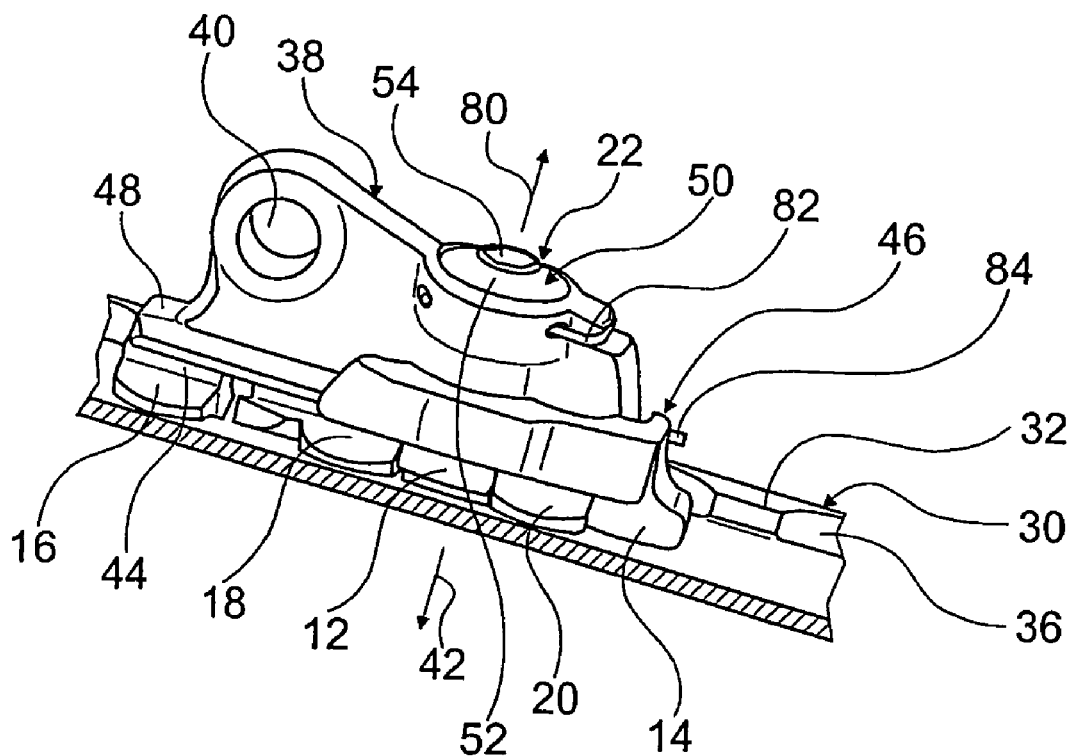
FIG. 3 shows the seat fixing device from FIG. 1 in the locked state with fixing rail illustrated in cutaway form.
Figure 4:
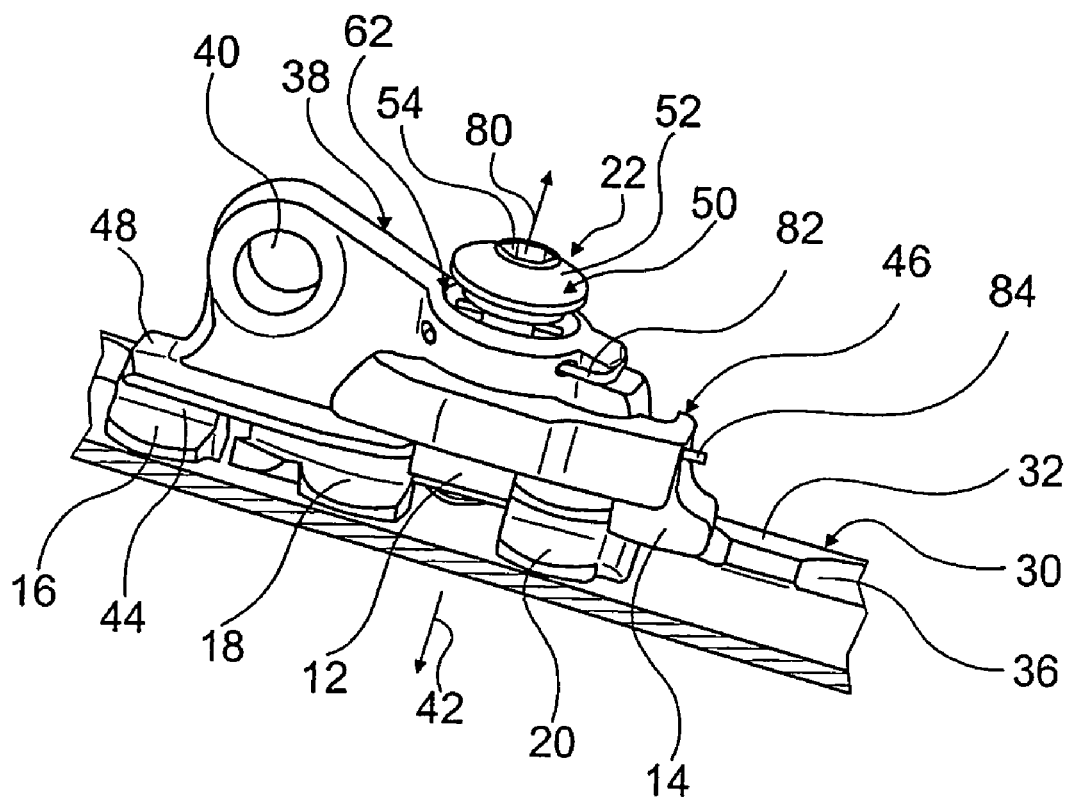
FIG. 4 shows the seat fixing device from FIG. 1 in the unlocked state with fixing rail illustrated in cutaway form.

The seat fixing device has a basic body 38 with an integrally formed bearing eye 40 for fixing a seat foot, to be precise for fixing a rear seat foot. The basic body 38 has a cover plate 48 which is integrally formed on it as a single piece, on the side of which which faces away from the bearing eye 40 a web 44 which is perpendicular to the cover plate 48 and has three vertical fixing means 16, 18, 20 is integrally formed as a single piece (FIGS. 3 and 4). The vertical fixing means 16, 18, 20 have formations in the form of segments of a circle protruding on both sides transversely with respect to the longitudinal extent of the basic body 38.

In addition, the seat fixing device has a sliding part 46 which is mounted essentially perpendicularly with respect to the cover plate 48 of the basic body 38 in a manner such that it can move relative to said basic body and is fixed relative to the basic body 38 parallel to the cover plate 48 in the longitudinal direction of the basic body 38. Two horizontal fixing means 12, 14 which essentially correspond in their shape to the passage openings 36 are integrally formed as a single piece on the sliding part 46. The sliding part 46 and the basic body 38 are captively connected in the longitudinal direction of the basic body 38 at an end of the basic body 38 which faces away from the bearing eye 40 by a pin 84 (FIGS. 5 to 8) which is fixed in a drilled hole 86 of the basic body 38 and protrudes into an elongated hole 88 of the sliding part 46.

Furthermore, the seat fixing device has an actuating unit 22 which serves as a locking and unlocking unit and has a locking screw 50. The locking screw 50 has a screw head 52 with a hexagon socket 54. The screw head 52 is adjoined by a first bolt part 56 of the locking screw 50 with an external thread which merges into a second bolt part 58 without a thread. The second bolt part 58 has an outside diameter which corresponds to a core diameter of the first bolt part 56. The second bolt part 58 merges into a third bolt part 60 with an external thread which corresponds, apart from length, to the thread of the first bolt part 56.

The locking screw 50 protrudes essentially perpendicularly with respect to the longitudinal direction, from a cover side of the basic body 38 in the direction 42 of a lower side of the basic body 38 into a recess 62 of the same (FIGS. 5 to 8). In addition, a prestressed helical compression spring 64 of a latching mechanism 24 of the actuating unit 22 is arranged in the recess 62 and is supported at its end facing the cover side of the basic body 38 on a supporting surface 66 of the basic body 38 and at its end facing away from the cover side of the basic body 38 on a supporting surface 68 of the sliding part 46. In the region of the cover side of the basic body 38, the recess 62 has a screw-head-receiving region 70 which is essentially matched in terms of its diameter and its depth to the screw head 52, so that the latter can be virtually completely recessed in the screw-head-receiving region 70. Between the screw-head-receiving region 70 and the supporting surface 66, the recess 62 has a threaded region 72 with an internal thread. The threaded region 72 is adjoined in the direction of the lower side of the basic body 38 by a spring-receiving region 74 of the recess 62 with a larger diameter in comparison to the threaded region 72. In the region of the lower side of the basic body 38, the recess 62 also has a receiving region 76 for receiving a web 78 of the sliding part 46.

Figure 5:
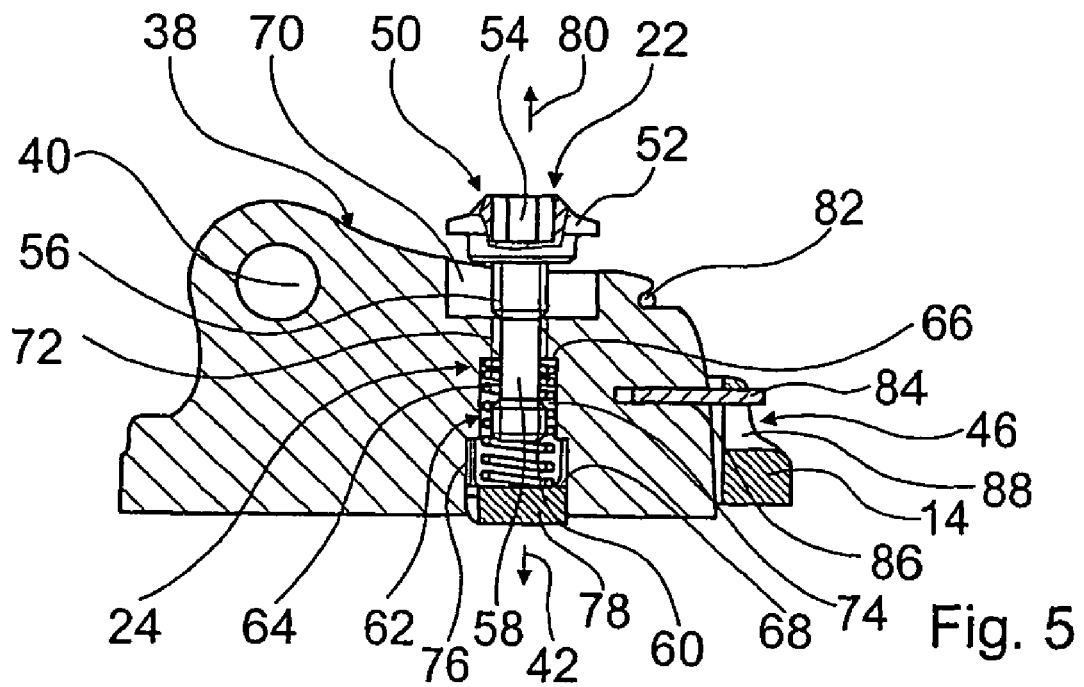
FIG. 5 shows a longitudinal section through the seat fixing device before a locking operation.

Before installation of the seat fixing device, the locking screw 50 is unscrewed by its external thread, which is provided on the first bolt part 56, out of the internal thread in the threaded region 72 in the direction facing away from the lower side of the basic body 38 (FIG. 5). The threaded part provided on the third bolt part 60 serves as a means of captively securing the locking screw 50 and, before installation, is situated in the spring-receiving region 74.

Figure 6:
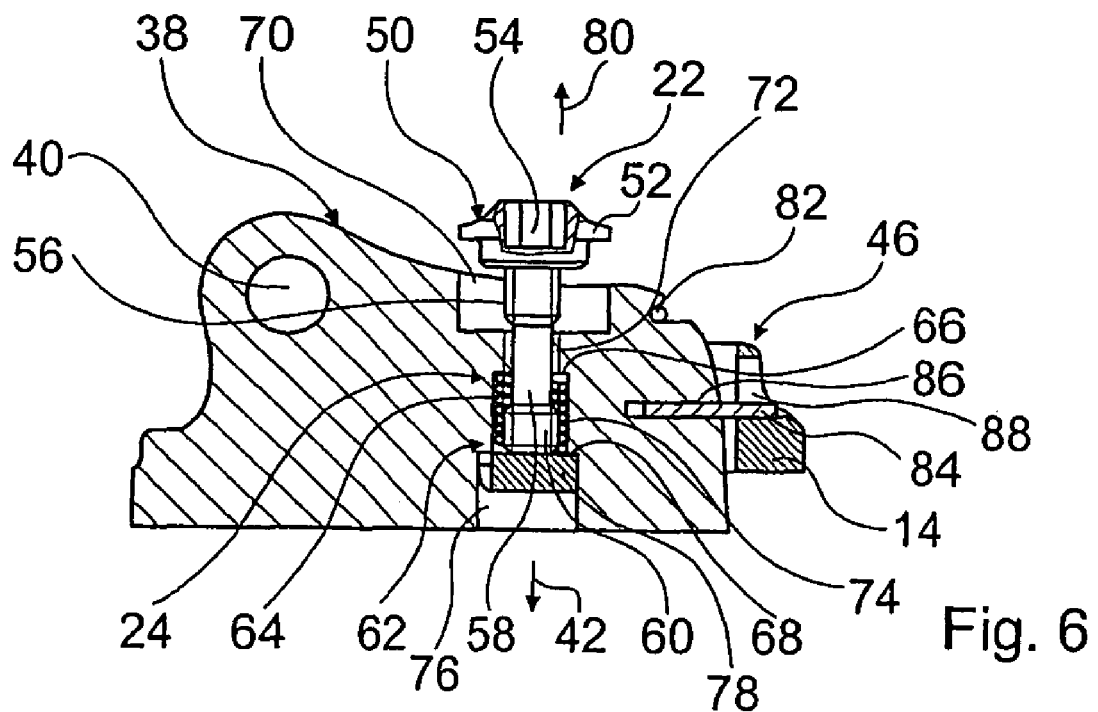
FIG. 6 shows the seat fixing device according to FIG. 5 during an installation operation.

During installation of the seat fixing device, the vertical fixing means 16, 18, 20 are guided through the passage openings 36. In the process, the horizontal fixing means 12, 14 come into contact with the upper side of the fixing rail 30, and the sliding part 46 is displaced together with the horizontal fixing means 12, 14 in a direction 80 facing away from the lower side of the basic body 38 (FIGS. 4 and 6). Upon movement of the sliding part 46 the same comes into contact with the locking screw 50 and displaces the latter further out of the recess 62, so that the thread of the first bolt part 56 and the internal thread are arranged at a distance from each other in the threaded region 72 (FIGS. 5 and 6).

Figure 7:
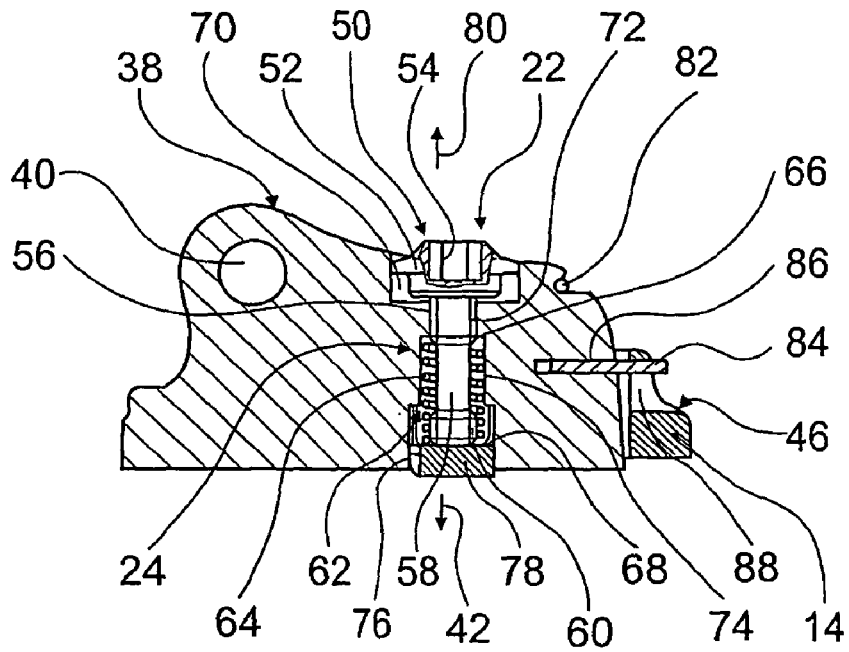
FIG. 7 shows the seat fixing device according to FIG. 5 after a locking operation, in the locked state.
Figure 8:
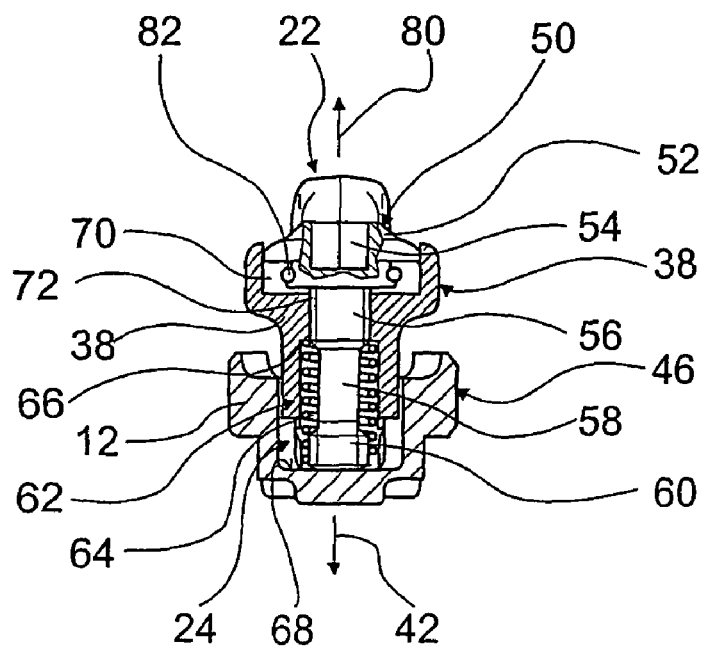
FIG. 8 shows a cross section through the seat fixing device in the locked state.

A locking function of the actuating unit 22 is coupled to the position of the sliding part 46 and therefore to the positions of the horizontal fixing means 12, 14, to be precise, locking can only be carried out by means of the locking screw 50 if the sliding part 46 and therefore the horizontal fixing means 12, 14 are arranged in their end position that faces away from the cover side of the basic body 38, as illustrated in FIGS. 3, 7 and 8. If the sliding part 46 is situated in its end position facing the cover side of the basic body 38, the locking screw 50 is blocked by the sliding part 46 in the direction of the lower side of the basic body 38, so that a coupling of the thread of the first bolt part 56 of the locking screw 50 to the internal thread in the threaded region 72 of the recess 62 or of the basic body 38 and therefore a screwing of the locking screw 50 into the basic body 38, which brings about a locking, is prevented.

In order to permit locking, the seat fixing device has to be displaced along the fixing rail 30 until the horizontal fixing means 12, 14 each come to lie in the region of the passage openings 36 and, driven by the helical compression spring 64 of the latching mechanism 24, latch into the passage openings 36 (FIG. 7). The position of the sliding part 46 and therefore of the horizontal fixing means 12, 14 is therefore detected mechanically and used as operating parameter. In order to further simplify, for an operator, a correct positioning of the seat fixing device in the longitudinal direction of the fixing rail 30, in addition a positioning-assisting unit 26 is provided with an output unit 28 formed by a sheet-metal spring. If the correct position is reached in the longitudinal direction of the fixing rail 30, the sheet-metal spring latches with an integrally formed, bulging region into a passage opening 36 and signals to an operator tactilely, and, in particular, acoustically that the correct position has been reached. The sheet-metal spring could also interact with a viewing window and a marking, with the result that an optical signal can be output to an operator, with reference to which the operator recognizes whether the seat fixing device is in a correct position.

If the horizontal fixing means 12, 14 are latched into the passage openings 36, the locking screw 50 can be screwed with the thread of the first bolt part 56 into the internal thread in the threaded region 72, as a result of which the horizontal fixing means 12, 14 are secured positively in their locking position (FIGS. 3, 7 and 8). Furthermore, the actuating unit 22 is provided for non-positive locking, to be precise, during installation, the sliding part 46 is loaded downward in the region of the recess 62 by means of the locking screw 50 and therefore assists the helical compression spring 64 in its clamping force. The loading causes the horizontal fixing means 12, 14 to be pressed against a floor part of the fixing rail 30 and causes the vertical fixing means 16, 18, 20, which, by displacement of the seat fixing device in the longitudinal direction of the fixing rail 30, come to lie between the passage openings 36, to be pressed from below against the profiled flanks 32 of the fixing rail 30. By means of the non-positive locking, freedom from play and protection against vibration are advantageously achieved. Alternatively, however, the actuating unit 22 could also be provided just for positive locking.

In order to avoid the locking screw 50 from being automatically released from its locking position, a securing unit with a clamp-type spring 82 is additionally provided, said clamp-type spring, in the locking position of the locking screw 50, latching into flattened portions integrally formed on the latter and serving as a means of securing against rotation.

For removal, the locking screw 50 is unscrewed again with the thread of the first bolt part 56 out of the internal thread in the threaded region 72. The sliding part 46 is subsequently raised manually by the operator from the upper side of the fixing rail 30 in order subsequently to be able to displace the seat fixing device in the longitudinal direction of the fixing rail 30 and to be able to remove it therefrom.

FIGS. 9 to 12 illustrate an alternative seat fixing device. Components, features and functions which essentially remain the same are in principle numbered with the same reference numbers. However, to differentiate between the exemplary embodiments, the letter *a* is added to the reference numbers of the exemplary embodiment in FIGS. 9 to 12. The description below is essentially restricted to the differences over the exemplary embodiment in FIGS. 1 to 8, with it being possible to make reference with regard to components, features and functions which remain the same to the description for the exemplary embodiment in FIGS. 1 to 8.

The seat fixing device has an actuating unit 22*a* which serves as locking and unlocking unit and has a locking screw 50*a*.

Figure 10:
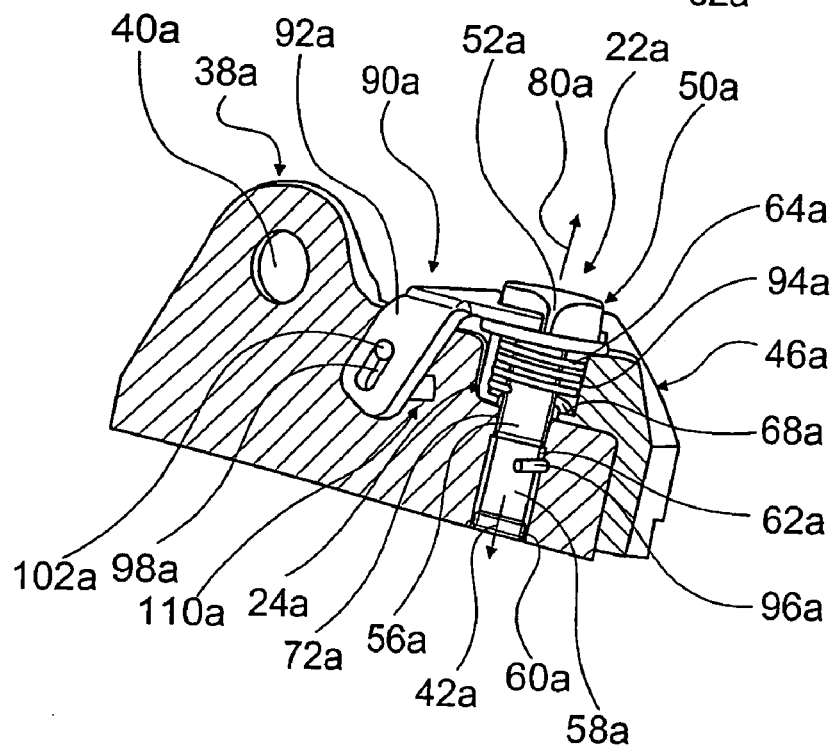
FIG. 10 shows a longitudinal section through the seat fixing device from FIG. 9 in the locked state.
Figure 12:
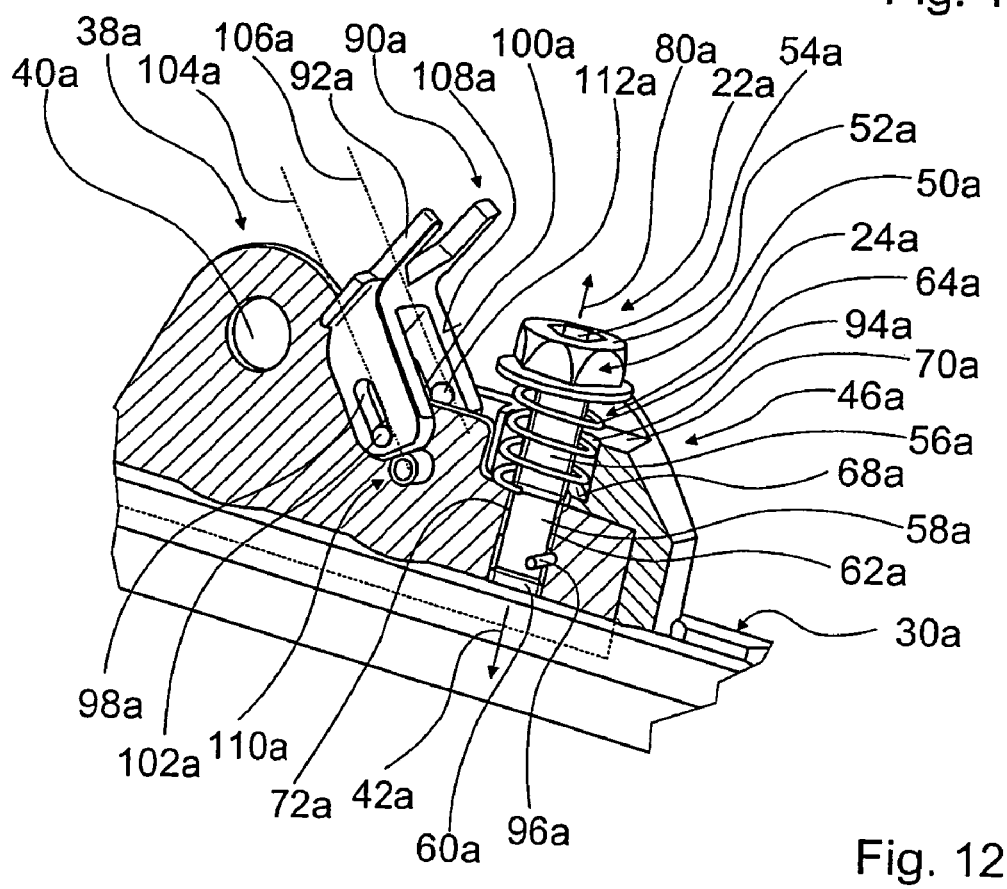
FIG. 12 shows the seat fixing device during the installation operation in an installation stage following FIG. 11.

The locking screw 50*a* protrudes essentially perpendicularly with respect to the longitudinal direction, from a cover side of a sliding part 46*a* and of a basic body 38*a* in the direction 42*a* of a lower side of the basic body 38*a* into recesses 62*a*, 94*a* of the sliding part 46*a* and of the basic body 38*a* (FIGS. 10 and 12).

In addition, a pre-stressed helical compression spring 64*a* of a latching mechanism 24*a* of the actuating unit 22*a* is arranged in the recess 94*a* of the sliding part 46*a*, said helical compression spring being supported at its upper end—as viewed in a fitted position—on a screw head 52*a* of the locking screw 50*a* and at its lower end on a supporting surface 68*a* which is formed by an extension of the sliding part 46*a* which is in the shape of an annular disk and points radially inward. The recess 94*a* of the sliding part 46*a* above the supporting surface 68*a* is essentially matched in terms of its diameter and its depth to the screw head 52*a*, with the result that the latter can be virtually completely recessed therein. Starting from its upper end—as viewed in the fitted position—which faces the sliding part 46*a*, the recess 62*a* of the basic body 38*a* has, in the first third of its length, a threaded region 72*a* with an internal thread. The threaded region 72*a* is adjoined in the direction of the lower side of the basic body 38*a* by a thread-free region with a diameter which is larger in comparison to the threaded region 72*a*.

Before installation of the seat fixing device, the locking screw 50a is unscrewed with its external thread, which is provided in a first bolt part 56a, out of the internal thread of the threaded region 72a in the direction facing away from the lower side of the basic body 38a (FIG. 12). To secure it captively, a transverse pin 96a is pushed into the basic body 38a after installation of the locking screw 50a, said transverse pin protruding into the recess 62a, so that a threaded part is secured on a third bolt part 60a of the locking screw 50a, on the side facing the lower side of the basic body 38a, and inadvertent unscrewing of the locking screw 50a can be reliably avoided.

Figure 11:
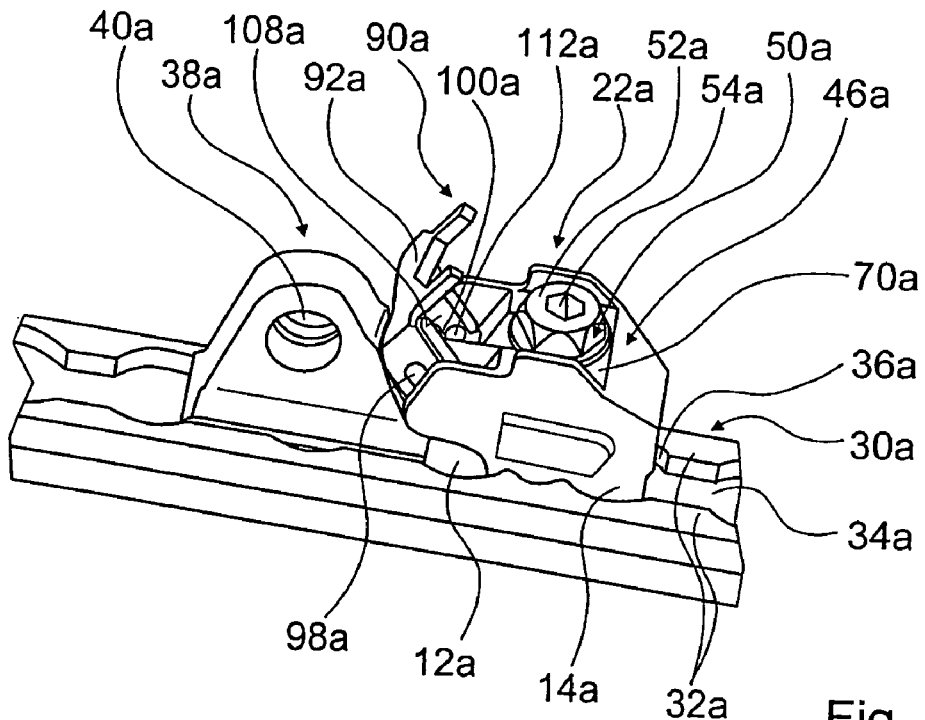
FIG. 11 shows the seat fixing device from FIG. 9 obliquely from above during an installation operation.

During installation of the seat fixing device, vertical fixing means 16a, 18a, 20a which are integrally formed on the basic body 38a are guided through passage openings 36a of a fixing rail 30a. In the process, horizontal fixing means 12a, 14a which are integrally formed on the sliding part 46a come into contact with the upper side of the fixing rail 30a, and the sliding part 46a is displaced together with the horizontal fixing means 12a, 14a in a direction 80a facing away from the lower side of the basic body 38a (FIG. 11).

A locking function of the actuating unit 22a is coupled to the position of the sliding part 46a and therefore to the positions of the horizontal fixing means 12a, 14a, to be precise, locking by means of the locking screw 50a can only be carried out if the sliding part 46a and therefore the horizontal fixing means 12a, 14a are arranged in an end position which faces the lower side of the basic body 38a and, upon installation, faces the fixing rail 30a, as illustrated in FIGS. 10 and 12. If the sliding part 46a is situated in an end position facing away from the lower side of the basic body 38a, the locking screw 50a is blocked by the helical compression spring 64a and the sliding part 46a in the direction of the lower side of the basic body 38a, so that a coupling of the thread of the first bolt part 56a of the locking screw 50a with the internal thread in the threaded region 72a of the recess 62a or of the basic body 38a and therefore a screwing of the locking screw 50a into the basic body 38a, bringing about a locking, is prevented. In an attempt to screw in the locking screw 50a, the helical compression spring 64a is compressed to its full extent before the locking screw 50a can be screwed into the threaded region 72a of the recess 62a.

In order to permit locking, the seat fixing device has to be displaced along the fixing rail 30a until the horizontal fixing means 12a, 14a each come to lie in the region of the passage openings 36a and, driven by the helical compression spring 64a of the latching mechanism 24a, latch into the passage openings 36a (FIG. 12). The position of the sliding part 46a and therefore of the horizontal fixing means 12a, 14a is therefore detected mechanically and used as operating parameter. Even before the locking screw 50a is screwed into the internal thread of the threaded region 72a, the horizontal fixing means 12a, 14a are secured in their locking position by a spring force of the helical compression spring 64a.

If the horizontal fixing means 12a, 14a are latched into the passage openings 36a, the locking screw 50a can be screwed with the thread of the first bolt part 56a into the internal thread in the threaded region 72a, as a result of which the horizontal fixing means 12a, 14a are secured positively in their locking position (FIG. 10). Furthermore, the actuating unit 22a is provided for non-positive locking, to be precise, during installation, the locking screw 50a is used to press the basic body 38a and the vertical fixing means 16a, 18a, 20a, which, by displacement of the seat fixing device in the longitudinal direction of the fixing rail 30a, come to lie between the passage openings 36a, from below against profiled flanks 32a of the fixing rail 30a. By means of the non-positive locking, freedom from play and protection against vibration are advantageously achieved.

In order to avoid the locking screw 50a from being automatically released from its locking position, an actuating unit 90a forming a securing unit is additionally provided. A securing function of the actuating unit 90a is likewise coupled to the position of the sliding part 46a and therefore to the positions of the horizontal fixing means 12a, 14a, to be precise, a pivotably mounted securing clamp 92a of the actuating unit 90a can be pivoted from its release position (FIGS. 11 and 12), in which the securing clamp 92a is pivoted into its end position facing away from the locking screw 50a, only into its end position securing and locking the locking screw 50a in its rotational position and facing the locking screw 50a if the sliding part 46a is displaced into its end position facing the lower side of the basic body 38a. The securing clamp 92a has elongated holes 98a, 100a which are provided in side limbs and via which said securing clamp is mounted pivotably on a spindle 102a fixed in the basic body 38a. In this case, the elongated holes 98a, 100a are arranged eccentrically, on the side facing away from the locking screw 50a, with respect to longitudinal center axes 104a, 106a of the limbs, as viewed in the upper end position of the securing clamp 92a that faces away from the locking screw 50a (FIGS. 11 and 12). If, during installation, the sliding part 46a is displaced in the direction facing away from the lower side of the basic body 38a, the sliding part 46a comes into contact in this case with the securing clamp 92a, to be precise, as viewed in the upper end position of the securing clamp 92a, with regions of the limbs of the securing clamp 92a that face the locking screw 50a, and displaces said securing clamp into its upper end position facing away from the lower side of the basic body 38a (FIG. 11). In this end position, the securing clamp 92a is blocked by the sliding part 46a in its pivoting movement in the direction of the locking screw 50a, so that it cannot be pivoted in the direction of the locking screw 50a to lock and to secure the same.

In addition, the actuating unit 90a is formed as a single piece with an optical signal output unit. The securing clamp 92a has on its lower side facing the locking screw 50a—as viewed in the end position facing away from the locking screw 50a—a colored, in particular red signaling means 108a which signals to an operator that the seat fixing device is not yet correctly fitted and locked.

Figure 9:
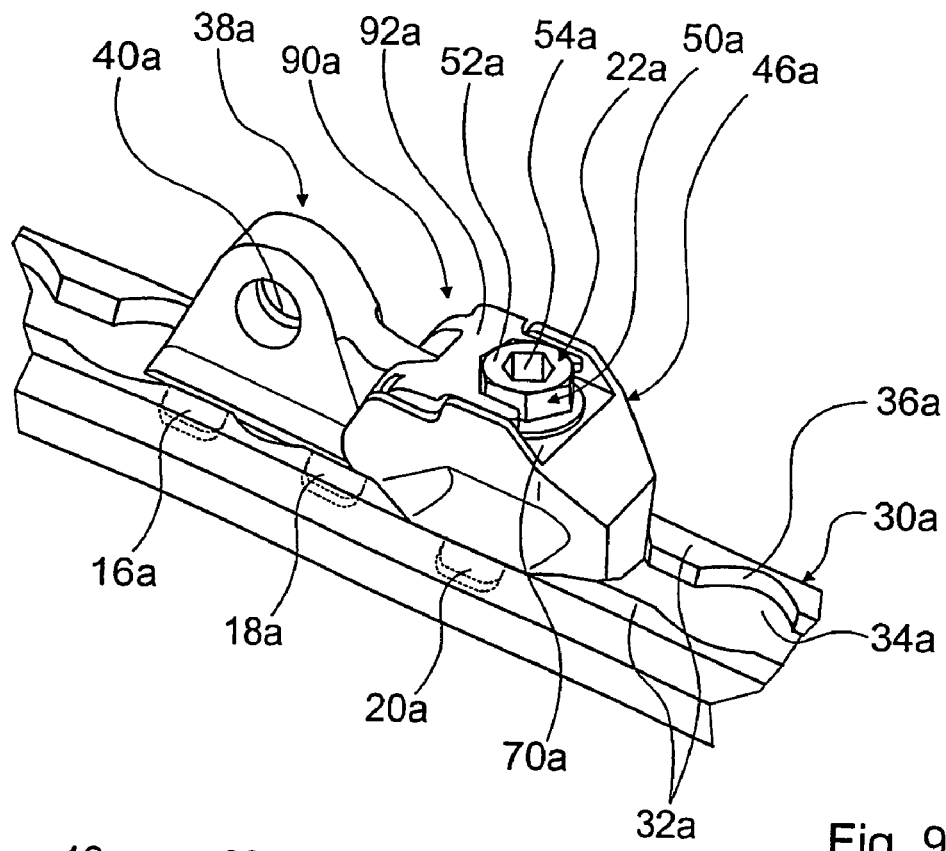
FIG. 9 shows a perspective view of an alternative seat fixing device from above in the fitted state on a fixing rail.

Only when the sliding part 46a is latched into its end position facing the lower side of the basic body 38a and the locking screw 50a is screwed into the basic body 38a for locking purposes can the securing clamp 92a be pivoted into its end position which faces the locking screw 50a and in which the signaling means 108 is completely concealed (FIGS. 9 and 10). In order to secure the securing clamp 92a in its end position facing the locking screw 50a, spherical compression pieces 110a are arranged on the basic body 38a and, in the end position of the securing clamp 92a that faces the locking screw 50a, latch into depressions 112a arranged on insides of the limbs of the securing clamp 92a (FIGS. 10 and 12).

For removal, the locking screw 50a is unscrewed again with the thread of the first bolt part 56a from the internal thread in the threaded region 72a. The securing clamp 92a is pivoted into its end position facing away from the locking screw 50a, and the sliding part 46a is subsequently raised manually by the operator from the upper side of the fixing rail 30a in order to be able subsequently to displace the seat fixing device in the longitudinal direction of the fixing rail 30a and to be able to remove it therefrom.

The invention is described herein in detail with particular reference to presently preferred exemplary embodiments. However, it will be understood that variations and modifications can be effected within the scope and spirit of the invention.

The invention claimed is:

1. A seat fixing device, in particular for fixing an airplane seat to a floor of an airplane, comprising:
   at least one vertical fixing member;
   at least one horizontal fixing member; and
   at least one actuating unit, which comprises at least one latching mechanism for directly positioning the at least one horizontal fixing member, in at least one state of operation, wherein at least one function of the actuating unit is dependent on an operating parameter.

2. The seat fixing device as claimed in claim 1, wherein the operating parameter comprises an operating parameter of the horizontal fixing member that is at least dependent on a position of the at least one horizontal fixing member.

3. The seat fixing device as claimed in claim 2, wherein the at least one function of the actuating unit is dependent on a position of the at least one horizontal fixing member.

4. The seat fixing device as claimed in claim 2, further comprising a detecting unit for mechanically detecting the operating parameter of the horizontal fixing member.

5. The seat fixing device as claimed in claim 1, wherein the actuating unit comprises a locking unit.

6. The seat fixing device as claimed in claim 5, wherein the actuating unit is operable for locking only if the at least one operating parameter is present.

7. The seat fixing device as claimed in claim 5, wherein the actuating unit is provided with positive locking.

8. The seat fixing device as claimed in claim 5, wherein the actuating unit is provided with non-positive locking.

9. The seat fixing device as claimed in claim 1, further comprising at least one positioning-assisting unit with an output unit.

10. The seat fixing device as claimed in claim 1, wherein the actuating unit includes a securing unit for securing the actuating unit in at least one position.

11. The seat fixing device as claimed in claim 10, wherein the actuating unit includes a signal output unit for signaling at least one of an unfitted and an unlocked state of the horizontal fixing member.

12. The seat fixing device as claimed in claim 10, wherein the actuating unit includes at least one pivotably mounted clamp.

13. The seat fastening device as claimed in claim 1, wherein the actuating unit comprises at least one locking screw.

14. The seat fastening device as claimed in claim 13, wherein the at least one locking screw comprises a first bolt part with an external thread, which merges in a second bolt part, which merges in a third bolt part with an external thread.

15. The seat fastening device as claimed in claim 1, wherein the at least one latching mechanism comprises at least one spring member.

16. The seat fastening device as claimed in claim 1, wherein the actuation unit is configured coaxially to the latching mechanism.

* * * * *